US011999370B2

(12) United States Patent
Stayton et al.

(10) Patent No.: US 11,999,370 B2
(45) Date of Patent: Jun. 4, 2024

(54) AUTOMATED VEHICLE SYSTEM

(71) Applicant: Nissan North America, Inc., Franklin, TN (US)

(72) Inventors: Erik Stayton, Ashland, MA (US); Erik Vinkhuyzen, Morgan Hill, CA (US); Stefan Witwicki, San Carlos, CA (US)

(73) Assignee: Nissan North America, Inc., Franklin, TN (US)

( * ) Notice: Subject to any disclaimer, the term of this patent is extended or adjusted under 35 U.S.C. 154(b) by 486 days.

(21) Appl. No.: 16/528,176

(22) Filed: Jul. 31, 2019

(65) Prior Publication Data
US 2021/0031793 A1 Feb. 4, 2021

(51) Int. Cl.
*B60W 50/14* (2020.01)
*G05D 1/00* (2006.01)
*G05D 1/02* (2020.01)
*H04W 4/46* (2018.01)

(52) U.S. Cl.
CPC ........... *B60W 50/14* (2013.01); *G05D 1/0276* (2013.01); *H04W 4/46* (2018.02); *B60W 2050/143* (2013.01); *B60W 2050/146* (2013.01); *B60W 2556/65* (2020.02)

(58) Field of Classification Search
CPC ............. B60W 50/14; B60W 2556/65; B60W 2050/146; B60W 2050/143; B60W 2540/225; G05D 1/0276; G05D 2201/0213; G05D 1/0088; H04W 4/46
See application file for complete search history.

(56) References Cited

U.S. PATENT DOCUMENTS

| 9,147,353 B1 | 9/2015 | Slusar |
| 9,390,451 B1* | 7/2016 | Slusar .................... G06Q 40/08 |
| 9,466,161 B2 | 10/2016 | Ricci |
| 9,766,625 B2 | 9/2017 | Boroditsky et al. |

(Continued)

FOREIGN PATENT DOCUMENTS

| CN | 104590250 B | 11/2017 |
| EP | 2312552 A2 | 4/2011 |

(Continued)

OTHER PUBLICATIONS

B Groza, "Traffic models with adversarial vehicle behaviour", arXiv, Jan. 26, 2017, 14 pages, Politehnica University of Timisoara, Romania.

(Continued)

*Primary Examiner* — Ian Jen
*Assistant Examiner* — Renee LaRose
(74) *Attorney, Agent, or Firm* — Global IP Counselors, LLP

(57) ABSTRACT

An automated vehicle system includes an information system, data storage, an electronic controller and a notification device. The information system is configured to receive information related to an environment of the automated vehicle. The data storage has a predetermined socially acceptable behavior parameter stored therein. The electronic controller is configured to compare the information to the predetermined socially acceptable behavior parameter and determine vehicle behavior based on the information. The notification device is configured to present a notification of a course of action based on the determined vehicle behavior.

20 Claims, 12 Drawing Sheets

(56) References Cited

U.S. PATENT DOCUMENTS

| | | | |
|---|---|---|---|
| 10,065,652 B2 | 9/2018 | Shenoy et al. | |
| 10,275,959 B2 | 4/2019 | Ricci | |
| 10,885,539 B1* | 1/2021 | Purgatorio | B60W 40/09 |
| 2013/0093888 A1 | 4/2013 | Kim | |
| 2015/0081404 A1* | 3/2015 | Basir | G06Q 30/08 |
| | | | 705/14.1 |
| 2016/0055747 A1 | 2/2016 | Ricci | |
| 2016/0232550 A1* | 8/2016 | Fletcher | G06Q 30/0226 |
| 2016/0314538 A1 | 10/2016 | Ricci | |
| 2017/0132917 A1 | 5/2017 | Ricci | |
| 2018/0074501 A1 | 3/2018 | Boniske et al. | |
| 2018/0170372 A1 | 6/2018 | Takamatsu et al. | |
| 2018/0334176 A1 | 11/2018 | Park | |
| 2018/0349711 A1 | 12/2018 | Prasad | |
| 2019/0011917 A1* | 1/2019 | Kuffner, Jr. | G08G 1/163 |
| 2019/0066535 A1 | 2/2019 | Pifko et al. | |
| 2022/0005291 A1* | 1/2022 | Konrardy | G07C 5/008 |

FOREIGN PATENT DOCUMENTS

| | | | |
|---|---|---|---|
| WO | 2008110739 A1 | 9/2008 | |
| WO | 2018026733 A1 | 2/2018 | |
| WO | 2019075341 A1 | 4/2019 | |

OTHER PUBLICATIONS

A Riener, "Social Driving Services: Very Cool, But How to Guarantee Application on Broad-Scale?", Sep. 17-19, 2014, pp. 1-4, Seattle, WA, USA.

* cited by examiner

AUTOMATED VEHICLE SYSTEM

BACKGROUND

Field of the Invention

The present invention generally relates to an automated vehicle system. More specifically, the present invention relates to an automated vehicle system that facilitates improved social behavior.

Background Information

The operation of modern vehicles is becoming increasingly autonomous, causing a decrease in driver intervention. A control feature of such a modern vehicle may cause the vehicle to recognize a moving object (e.g., another vehicle), recognize location situations, and react accordingly. The recognition of moving objects and location situations may include a dimensional determination, speed, travel direction, and distance at any given moment in time.

SUMMARY

It has been discovered that an improved system for an automated vehicle is desired. That is, when autonomous control of a vehicle is turned off, the autonomous systems do not facilitate improved driving. The system for the automated vehicle according to embodiments of the present invention is capable of facilitating improved driving even in circumstances when the vehicle is not operating autonomously.

In view of the state of the known technology, one aspect of the present disclosure is to provide an automated vehicle system including an information system, data storage, an electronic controller and a notification device. The information system is configured to receive information related to an environment of the automated vehicle. The data storage has a predetermined socially acceptable behavior parameter stored therein. The electronic controller is configured to compare the information to the predetermined socially acceptable behavior parameter and determine vehicle behavior based on the information. The notification device is configured to present a notification of a course of action based on the determined vehicle behavior.

Another aspect of the present disclosure is to provide a method of operating an automated vehicle, comprising receiving, via an information system, information related to an environment of the automated vehicle, data storage having a predetermined socially acceptable behavior parameter stored therein, comparing, via an electronic controller, the information to a predetermined socially acceptable behavior parameter stored in data storage, determining with the controller vehicle behavior based on the information; and notifying with a notification device a course of action based on the determined vehicle behavior.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
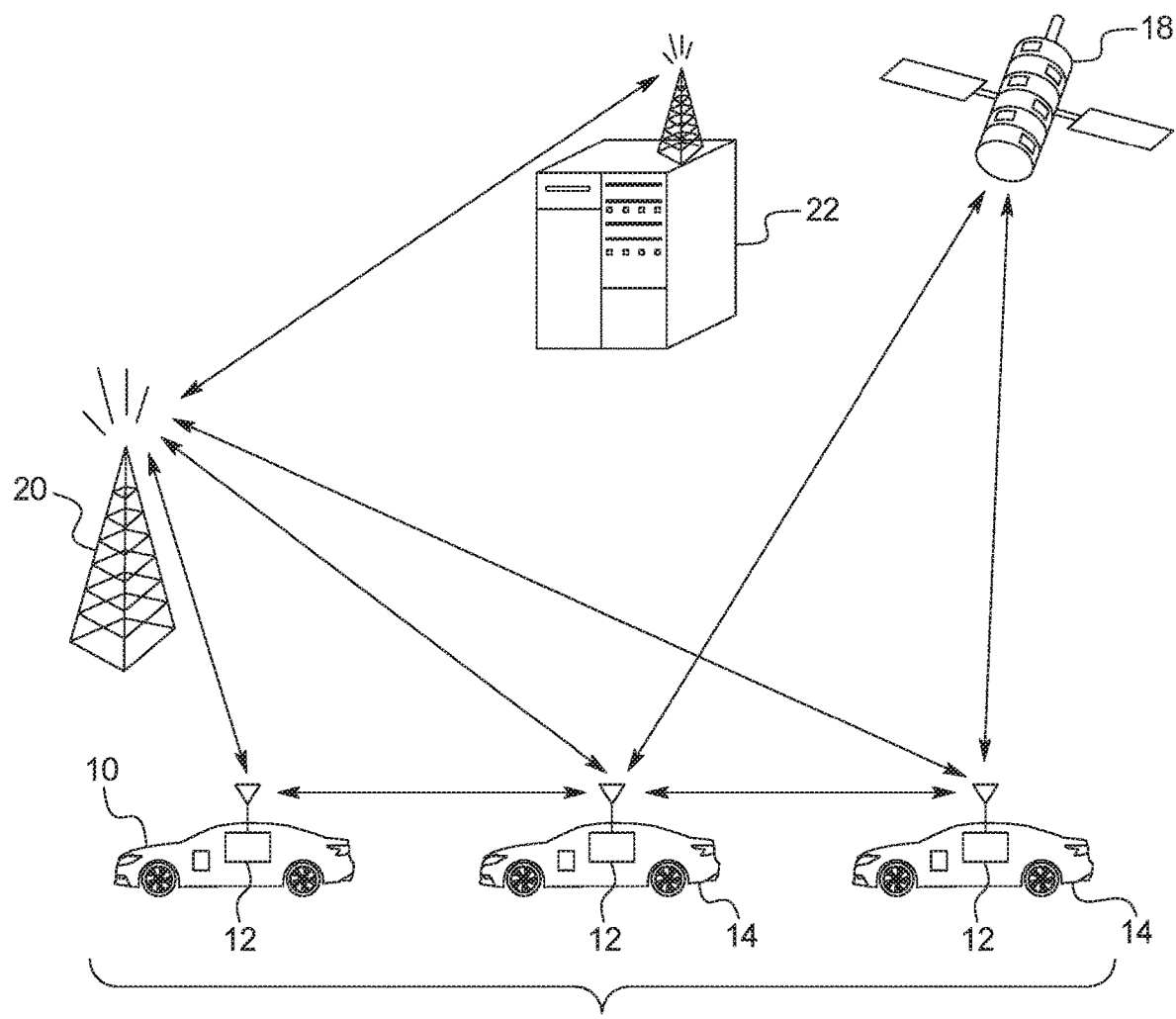
FIG. 1 is a schematic diagram illustrating an example of a host vehicle equipped with an automated vehicle system and components of a global positioning system (GPS)

FIG. 1 illustrates a two-way wireless communications network that includes vehicle to vehicle communication and vehicle to base station communication. In FIG. 1, an automated host vehicle 10 (HV) is illustrated that is equipped with an autonomous vehicle system 12 according to a disclosed embodiment, and the remote vehicle 14 (RV) that can also include the system 12. While the host vehicle 10 and the remote vehicle 14 are illustrated as having the same autonomous vehicle system 12, it will be apparent from this disclosure that each of the remote vehicles 14 can include another type of autonomous vehicle system (or any other system) that is capable of communicating information about at least the location, direction and speed of the remote vehicle 14 to the host vehicle 10.

Although FIG. 1 illustrates remote vehicles 14 with the capability of communicating with the host vehicle 10, in some embodiments, the remote vehicles 14 have no communication capabilities and their position, location, speed and/or trajectory can be determined in any other suitable manner, as described herein.

The autonomous vehicle system 12 facilities the host vehicle's 10 social driving behavior and improves interaction with remote vehicles. The autonomous vehicle system 12 enables the host vehicle 10 or the operator of the host vehicle 10 to understand socially acceptable behavior.

The autonomous vehicle system 12 of the host vehicle 10 and the remote vehicle 14 communicate with the two-way wireless communications network. As seen in FIG. 1, for example, the two-way wireless communications network can include one or more global positioning satellites 18 (only one shown), and one or more roadside (terrestrial) units 20 (only one shown), and a base station or external server 22. The global positioning satellites 18 and the roadside units 20 send and receive signals to and from the system 12 for determining the number of remote vehicles following a host vehicle of the host vehicle 10 and the remote vehicles 14. The base station 22 sends and receives signals to and from the system 12 for so that the remote vehicles 14 can communicate with the host vehicle 10 via a network of the roadside units 20, or any other suitable two-way wireless communications network.

Figure 2:
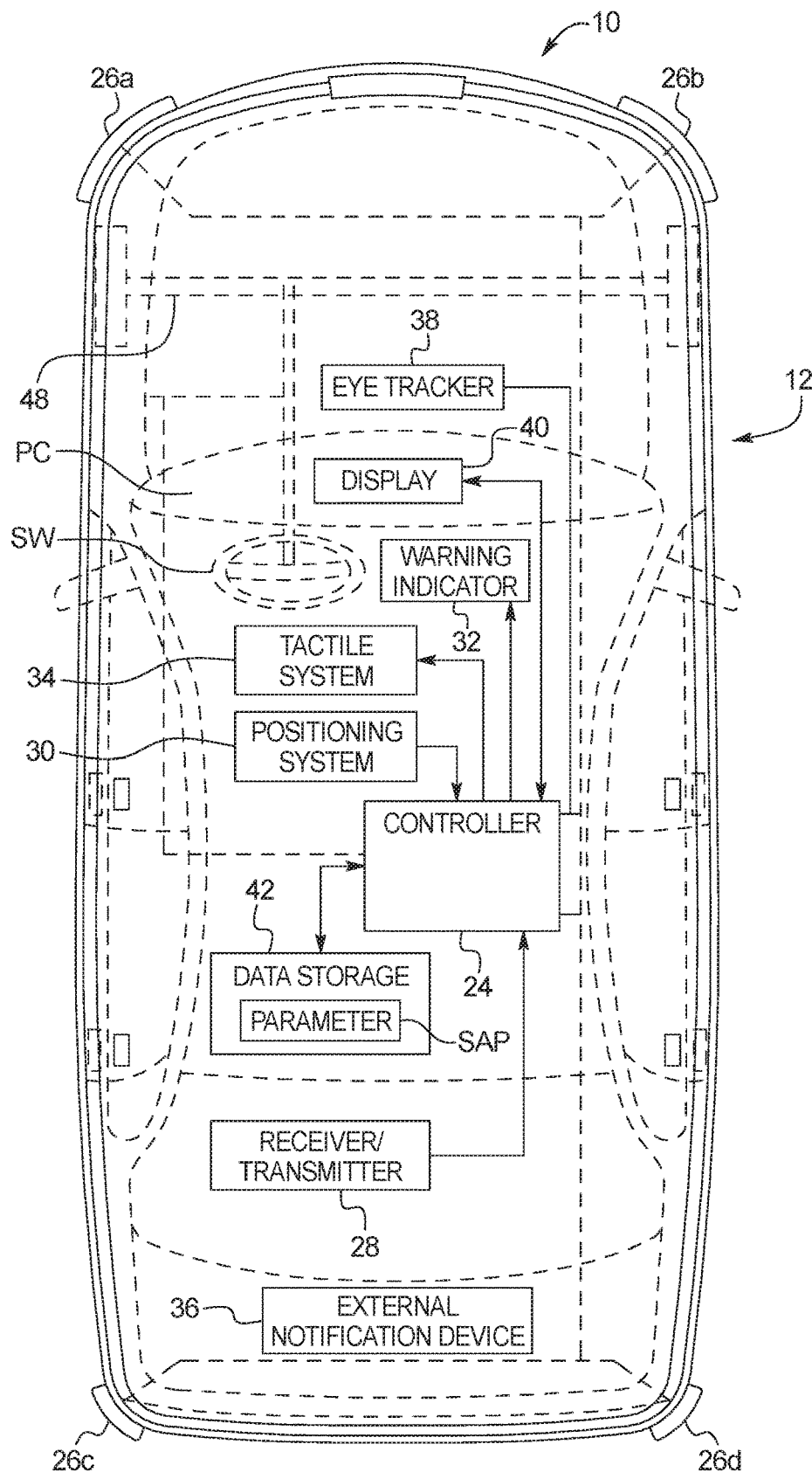
FIG. 2 is a block diagram of exemplary components of the host vehicle and the remote vehicles that are equipped with the automated vehicle system according to embodiments disclosed herein.

Referring to FIG. 2, an autonomous vehicle system 12 for a host vehicle 10 is illustrated in accordance with one embodiment. The system 12 includes a controller 24, an information system (i.e., a sensor system (sensors 26a-26d), receiver/transmitter system 28 and/or a positioning system 30), a warning indicator 32 or system, a tactile vibration system 34, data storage 42, an external notification device 36, an eye tracker 38 and a display 40. As understood herein, the warning indicator 32, the tactile vibration system 34, the display 40 and/or an audio alert may act as a notification system that notifies the occupant of the host vehicle 10 of a course of action in relation to the remote vehicle or vehicles.

The controller 24 is preferably and electronic controller and includes a microcomputer with a control program that controls the system 12 as discussed below. The controller 24 can also include other conventional components such as an input interface circuit, an output interface circuit, and storage device(s) (data storage 42) such as a ROM (Read Only Memory) device and a RAM (Random Access Memory) device. The microcomputer of the controller 24 is programmed to control one or more of the sensor system (sensors 26a-26d), the positioning system 30, the warning indicator 32 or system, the tactile vibration system 34, the receiver/transmitter system 28, the external notification device 36, the eye tracker 38, the display 40, data storage 42, and to make determinations or decisions, as discussed herein. The memory circuit stores processing results and control programs, such as ones for the sensor system (sensors 26a-26d), the positioning system 30, the warning indicator 32 or system, the tactile vibration system 34, the receiver/transmitter system 28, the external notification device 36, the eye tracker 38, the display 40, data storage 42 operation that are run by the processor circuit. The controller 24 is operatively coupled to the sensor system (sensors 26a-26d), the positioning system 30, the warning indicator 32 or system, the tactile vibration system 34, the receiver/transmitter system 28, the external notification device 36, the eye tracker 38, the display 40, data storage 42 in a conventional manner, as well as other electrical systems in the vehicle 10, such the turn signals, windshield wipers, lights and any other suitable systems. Such a connection enables the controller 24 to monitor and control any of these systems as desired. The internal RAM of the controller 24 stores statuses of operational flags and various control data. The internal ROM of the controller 24 stores the information for various operations. The controller 24 is capable of selectively controlling any of the components of the sensor system (sensors 26a-26d), the positioning system 30, the warning indicator 32 or system, the tactile vibration system 34, the receiver/transmitter system 28, the external notification device 36, the eye tracker 38, the display 40, data storage 42. It will be apparent to those skilled in the art from this disclosure that the precise structure and algorithms for the controller 24 can be any combination of hardware and software that will carry out the functions of the present invention.

As shown in FIG. 2, the controller 24 can include or be in communication with the display 40. The display 40 enables the controller 24 to provide information and/or feedback concerning the system 12 or any other suitable information. For example, in one embodiment, the display 40 can display information regarding the remote vehicles 14, including the location, position, speed and heading of the remote vehicle. The display 40 can provide instructions to the operator or occupant of the host vehicle 10 to enable the driver of the host vehicle 10 to perform the appropriate course of action.

In one embodiment, the sensor system (sensors 26a-26d) can include proximity sensors and optical sensors. In one embodiment, the proximity sensors include a plurality of sensors (sensors 26a-26d), and are configured to detect the boundary 44 of the road 46 or other stationary or moving objects (e.g., remote vehicles 14) in proximity to the sensor system (sensors 26a-26d). For example, as illustrated in FIG. 2, front sensors 26a and 26b in the sensor system are preferably mounted externally on the front bumper and rear sensors 26c and 2cd are mounted externally on the rear bumper of host vehicle 10. However, the sensors 26a-26d in the sensor system may be mounted on any suitable external portion of the host vehicle 10, including the front and rear quarter panels, the external mirrors or any combination of suitable areas.

The sensor system (sensors 26a-26d) is preferably configured to be capable of detecting the boundary 44 of the lane or a road 46 or other stationary or moving objects (e.g., remote vehicles 14). However, the sensor system (sensors 26a-26d) can be any type of system desirable. For example, the front sensors 26a and 26b and rear sensors 26c and 26d in the sensor system (sensors 26a-26d) can include a long-range radar device for detection of a remote vehicle 14 that is located at a distance from the front or the rear of the host vehicle 10. Thus, the radar sensors may be configured to detect objects at a predetermined distance (e.g., distances up to 200 m), and thus may have a narrow field of view angle (e.g., around 15°). Due to the narrow field of view angle, the long-range radar may not detect all objects in the front of in the rear of the host vehicle 10. Thus, if desired, the front sensors 26a and 26b and rear sensors 26c and 26d can include short-range radar devices to assist in monitoring the region in front of or to the rear of the host vehicle 10. However, the sensors in the sensor system (sensors 26a-26d) can be disposed in any position of the host vehicle 10 and may include any type and/or combination of sensors to enable detection of a remote vehicle 14. In addition, the sensor system (sensors 26a-26d) may include cameras, radar sensors, photo sensors or any combination thereof. Although FIG. 2 illustrates four sensor sensors 26a-26d, there can be as few or as many sensors desirable or suitable.

Although the sensor system (sensors 26a-26d) can be electronic detection devices that transmit electronic electromagnetic waves (e.g., radar), the sensors 26a-26d can be any suitable sensors that, for example, take computer-processed images with a digital camera and analyzes the images or emit lasers, as is known in the art. The sensor system (sensors 26a-26d) may be capable of detecting the position of the host vehicle 10 relative to the boundary 44 of the road 46, and also detect at least the speed, direction, acceleration and distance of the remote vehicle 10 relative to the host vehicle and the boundary 44 of the road 46. Further, the sensor system (sensors 26a-26d) may include object-locating sensing devices including range sensors, such as FM-CW (Frequency Modulated Continuous Wave) radars, pulse and FSK (Frequency Shift Keying) radars, sonar and Lidar (Light Detection and Ranging) devices, and ultrasonic devices which rely upon effects such as Doppler-effect measurements to locate forward objects, capable of detecting objects in a vicinity of the vehicle 10. Object-locating devices may include charged-coupled devices (CCD) or complementary metal oxide semi-conductor (CMOS) video image sensors, and other known camera/video image processors which utilize digital photographic methods to "view" forward or rearward objects including one or more remote vehicles 14. The sensor system (sensors 26a-26d) is in communication with the controller 24, and is capable of transmitting information to the controller 24.

Thus, as can be understood, the sensor system (sensors 26a-26d) is capable of detecting remote vehicles 14 both in front of and behind the host vehicle 10. Thus, the sensor system can transmit information relating to the speed and location of a following remote vehicle 14, a leading remote vehicle, a remote vehicle 14 that is traveling in an adjacent lane and traveling in an opposite direction of the host vehicle 10 and any other moving and or stationary remote vehicle 14.

The warning indicator 32 may include warning lights and/or a warning audio output and is in communication with the controller 24. For example, the warning indicator 32 may include a visual display or light indicator that flashes or illuminates the instrument cluster on the instrument panel of the host vehicle 10, activates a heads-up display is a visual readout in the display 40, is an audible noise emitted from speaker, or any other suitable visual display or audio or sound indicator or combination thereof that notifies the operator or interior occupant of the host vehicle 10 of a course of action in relation to the remote vehicle or vehicles or any other situation. In one embodiment, the warning indicator 32 can be in a specific location or produce a specific indication (sound or visual) that the remote vehicle 14 is approaching on a specific side of the host vehicle 10.

As shown in FIG. 2, the tactile vibration system 34 may include tactile feedback generated by the tactile vibration system 34 that can be a vibration actuator in the steering wheel SW, the driver seat, or any other suitable location within the host vehicle 10. That is, the feedback operation can include providing haptic feedback to a portion of an interior of the vehicle 10 located proximate to the driver. For example, the feedback operation may be tactile feedback in a specific location or produce a specific indication that the remote vehicle 14 is approaching on a specific side of the host vehicle 10.

It is noted that the warning indicator 32, the tactile vibration system 34 and the display 40 are shown as separate elements; however, in some embodiments the indicator 32, the tactile vibration system 34 and the display 40 can be one unit or system, such as a human machine interface (HMI) or any other system that would enable the controller to provide feedback or notification to the operator.

Additionally, the system 12 may also be connected to the steering system 48 of the vehicle 10, such that the controller 24 can control the steering system 48 of the vehicle 10 based on a predetermined set of criteria. The controller 24 can be connected to the steering wheel SW or any other suitable portion of the steering system 48. That is, the controller 24 can apply an assist force to a portion of the steering system 48 of the vehicle 10 to cause movement of the vehicle 10 away from the trajectory of the remote vehicle 14.

The system 12 may include a positioning system 26, such as a GPS. In one embodiment the vehicle 10 receives a GPS satellite signal. As is understood, the GPS processes the GPS satellite signal to determine positional information (such as location, speed, acceleration, yaw, and direction, just to name a few) of the vehicle 10. As noted herein, the positioning system 30 is in communication with the controller 24, and is capable of transmitting such positional information regarding the host vehicle 10 to the controller 24. Moreover, the controller 24 can cause host vehicle information (e.g., location, speed, acceleration, yaw, and direction, just to name a few) to be transmitted to the remote vehicles 14 via the receiver/transmitter system 28, and receive information (e.g., location, speed, acceleration, yaw, and direction, just to name a few) from the remote vehicles 14 via the receiver/transmitter system 28.

The positioning system 30 also can also include or be in communication with the data storage 42 which can store map data. Thus, in determining the position of the host vehicle 10 using any of the herein described methods, devices or systems, the positioning host of the vehicle 10 may be compared to the known data stored in the data storage 42. Thus, the system 12 may accurately determine the location of the host vehicle 10 on an electronic map. The data storage 42 may also store any additional information including the current or predicted vehicle position and any past vehicle 10 position or any other suitable information.

The receiver/transmitter system 28 is preferably the system that communicates with the two-way wireless communication network discussed above. The receiver/transmitter system 28 is configured to send information to the external server 22, the cloud or internet. The receiver/transmitter system 28 can be a combined system or a separate receiver and transmitter. The receiver/transmitter system 28 can send and receive information in any suitable manner, such as data packets. The receiver/transmitter system 28 can send and receive information to and from the two-way wireless communication network, directly to other vehicles (e.g., remote vehicles 14) or in a suitable manner. When in communication with other vehicles, the information can be sent directly to or received from the remote vehicle 14, when in range, or through cloud infrastructure; and in either case might be made secure or encrypted in various ways including by a blockchain infrastructure.

The receiver/transmitter system 28 includes, for example, a receiver and a transmitter configured as individual components or as a transceiver, and any other type of equipment for wireless communication. For example, the receiver/transmitter system 28 is configured to communicate wirelessly over one or more communication paths. Examples of communication paths include a cellular telephone network, a wireless network (Wi-Fi or a WiMAX), a DSRC (Dedicated Short-Range Communications) network, a power line communication network, etc. The receiver/transmitter system 28 is configured to receive information from external sources and to transmit such information to the controller 24. For example, the receiver/transmitter system 28 can communicate with another vehicle, or any other suitable entity via a communication network, direct communication, or in any suitable manner as understood in the art.

The monitor can be any system that tracks and records user activity. For example, the positioning system 30, the steering system 48 or any other system that can track the operator behavior and/or determine the operator action, and thus the vehicle action can be a monitor. In one embodiment, the monitor can be the eye tracker 38 (eye tracking device), which can be disposed within the passenger compartment of the vehicle 10 and is operable to track eye movement of the user. As understood in the art, the eye tracker 38 can also measure eye characteristics such as pupil diameter and so on. The eye tracker 38 provides eye tracking data to the controller 24 for purposes discussed herein. The eye tracker 38 can include, for example, data pertaining to scanning patterns and saccades, number of fixations, fixation duration of each fixation, and any other information common in the eye tracking technology. The eye tracker 38 can employ scene cameras and head-tracking features as understood in the art, or can be configured as a head-mounted system, such as a combination of an eye tracking device, or any other suitable type of arrangement for performing eye tracking operations as understood in the art. Also, the eye tracking operations, with or without the use of a scene camera, could be used to determine the head position of the user, and in consideration of this information, the position and angles of the displays such as display the vehicle 10 can be adjusted accordingly. In addition, the eye tracker 38 can be configured in a portable device such as a smart phone, a tablet or any other type of device that is portable. Furthermore, prior to performing the eye tracking operations as described herein, the controller 24 can operate the eye tracker 38 to perform calibration operations with regard to the eye movement of the occupant if, for example, more accurate eye tracking is desirable.

Figure 3:
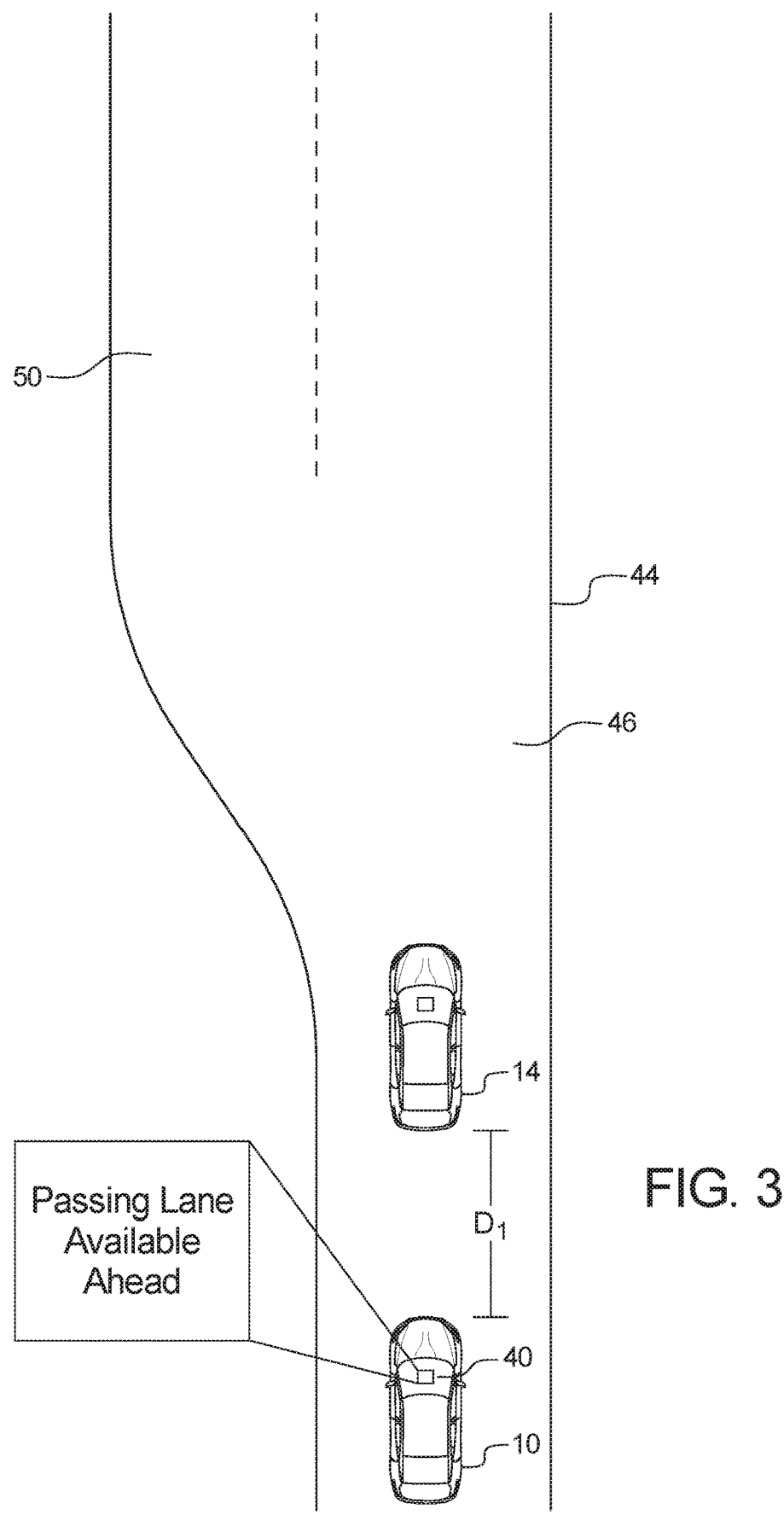
FIG. 3 is a schematic representation of a host vehicle traveling along a road and the automated vehicle system indicating improved social behavior.

The external notification device 36 can be a text display that is disposed on the vehicle 10 (e.g., the rear) so as to be capable of externally indicating a state or intent of the vehicle 10. That is, the external notification device 36 is configured to notify a remote vehicle 14 of the course of action of the host vehicle 10. Thus, in one embodiment, the external notification device 36 can display, in text, a plurality of modes that indicate the state of the vehicle 10. For example, in one mode, as shown in FIG. 3, the external notification device 36 can display "TAKING TURN OUT" indicating that the vehicle 10 is pulling over to enable the remote vehicles 14 to pass. However it is noted that a text display is merely an example and any suitable notification can be used, such as an iconic or abstract display or other modalities, such as directional sound.

Figure 4:
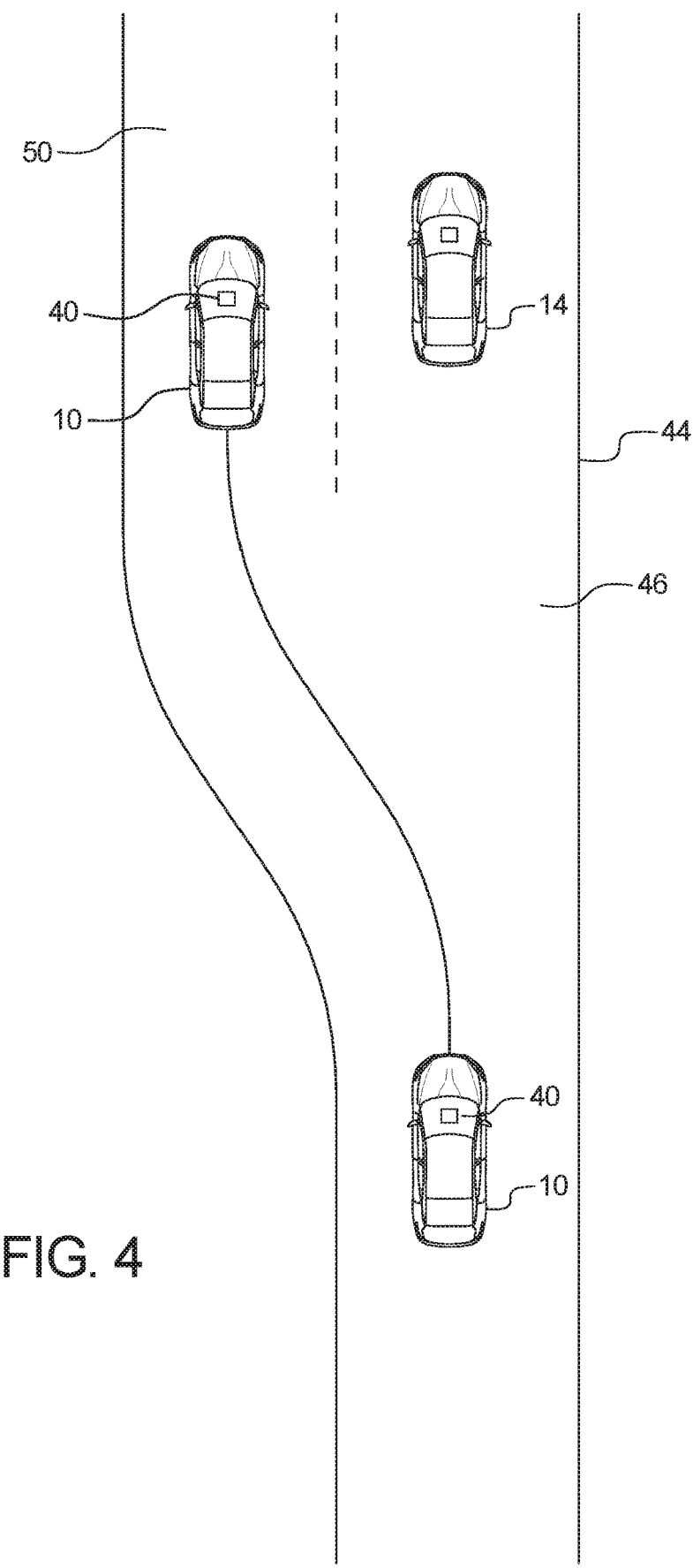
FIG. 4 is a schematic representation of the host vehicle of FIG. 3 changing lanes.

FIGS. 3 and 4 illustrate a first embodiment of the system 12 and procedure. In this embodiment, the host vehicle 10 is traveling along road 46 following a remote vehicle 14. In this embodiment, socially acceptable behavior would require the host vehicle 10 to follow the remote vehicle 14 at a safe distance and pass when appropriate. Thus, as the host vehicle 10 travels along the road 46, the information system receives information related to an environment of the host vehicle 10. That is, in this embodiment the sensor system (sensors 26a-26d) detects a change in the road 46 or the positioning system 30 can determine that a change in the road will occur passed on map data in the data storage 42, for example, a passing or additional lane will open ahead. The controller retrieves information stored in the data storage 42, such as a predetermined socially acceptable behavior parameter SAP. In this embodiment, the predetermined socially acceptable behavior parameter SAP can be information that when the host vehicle is following the remote vehicle within a predetermined distance $D_1$ or is approaching the remote vehicle and comes within a predetermined distance $D_1$, it is socially acceptable to follow the remote vehicles at a safe distance and pass when appropriate.

The controller 24 compares the information received from the information system to the predetermined socially acceptable behavior parameter SAP and determines the host vehicle 10 behavior based on the information. That is, the controller 24 can determine that the host vehicle 10 is following the remote vehicle 14 and is within a predetermined distance $D_1$ of the remote vehicle 14 and that a change in the road 46 is ahead. Once the controller determines that a socially acceptable behavior is warranted, the controller 24 can cause the notification device to present a notification of a course of action based on the determined vehicle behavior.

In one embodiment, the notification device can be the display 40, which displays in the passenger compartment PC of the host vehicle 10 a visual notification of a socially acceptable course of action (i.e., a visual course of action). For example, the display 40 can display a representation of map data indicating a lane 50 opening ahead and the host vehicle 10 should be operated to safely following the remote vehicle 14 and turn into the lane 50 at an appropriate time. Alternatively, the display 40 can present text information that the lane 48 is opening a distance ahead and the host vehicle 10 should be operated to safely following the remote vehicle 14 and turn into the lane 50 at an appropriate time. In other embodiments, any suitable notification—e.g., a light, a tactile vibration, a manipulation of the steering system 48 or any other notification or combination of notifications—can be made.

As shown in FIG. 4, the operator of the host vehicle 10 can then operate the host vehicle 10 to turn into the lane 50 at an appropriate time, enabling the host vehicle 10 to pass the remote vehicle 14. The operator of the host vehicle 10 will thus learn and understand socially acceptable behavior based on the notification of the system 12. Alternatively, the host vehicle 10 can autonomously perform an operation that will maneuver the host vehicle 10 into the lane 50 to enable the host vehicle 10 to pass the remote vehicle 14. The operator of the host vehicle 10 will thus learn and understand socially acceptable behavior based on the operation of the system 12.

In one embodiment, the monitor (e.g., the positioning system 30, sensor system (sensors 26a-26d), and/or the steering system 48 can monitor the vehicle behavior to determine whether the operator of the vehicle 10 operated the vehicle 10 in the manner suggested.

Figure 5:
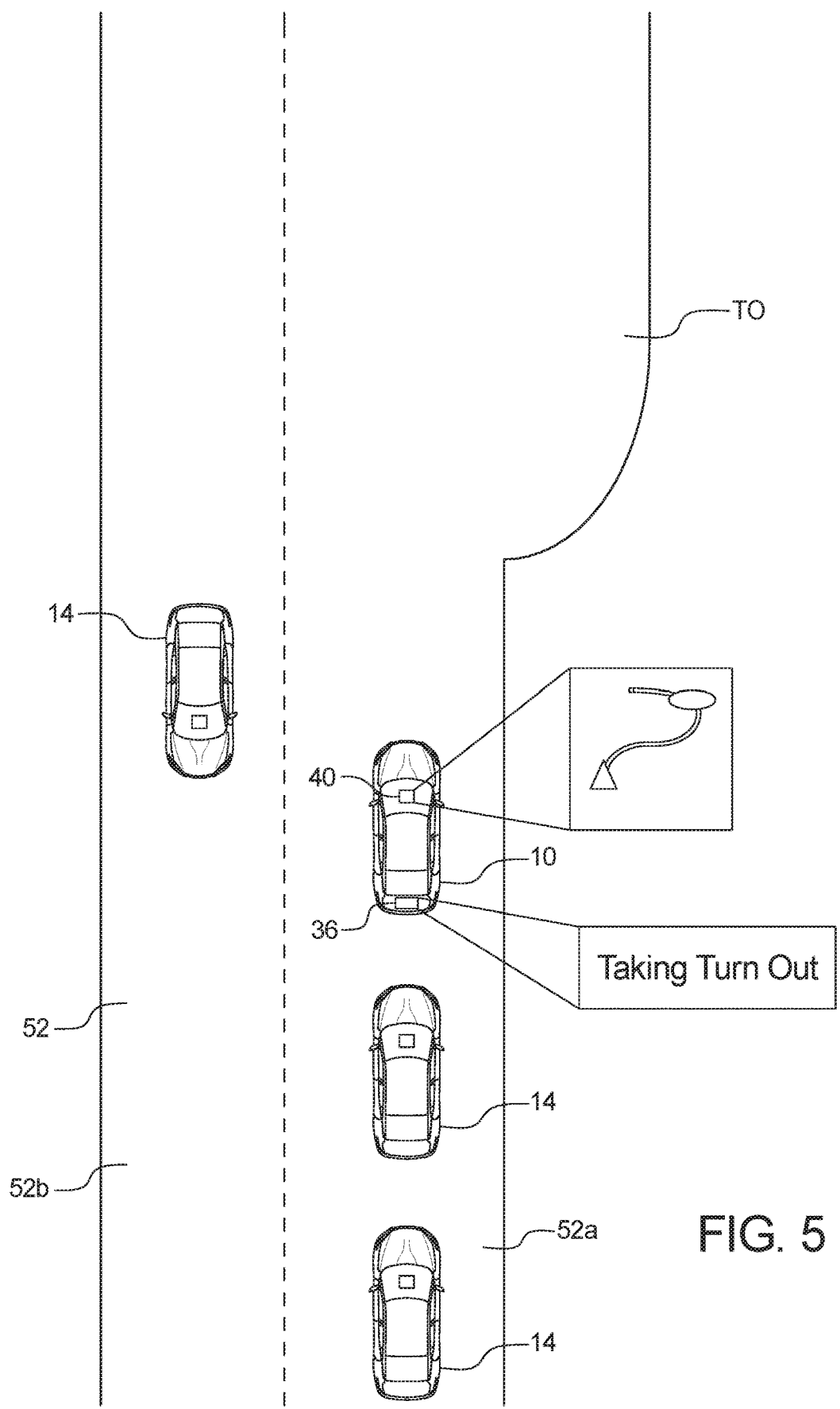
FIG. 5 is a schematic representation of a host vehicle traveling along a road and the automated vehicle system indicating improved social behavior.
Figure 6:
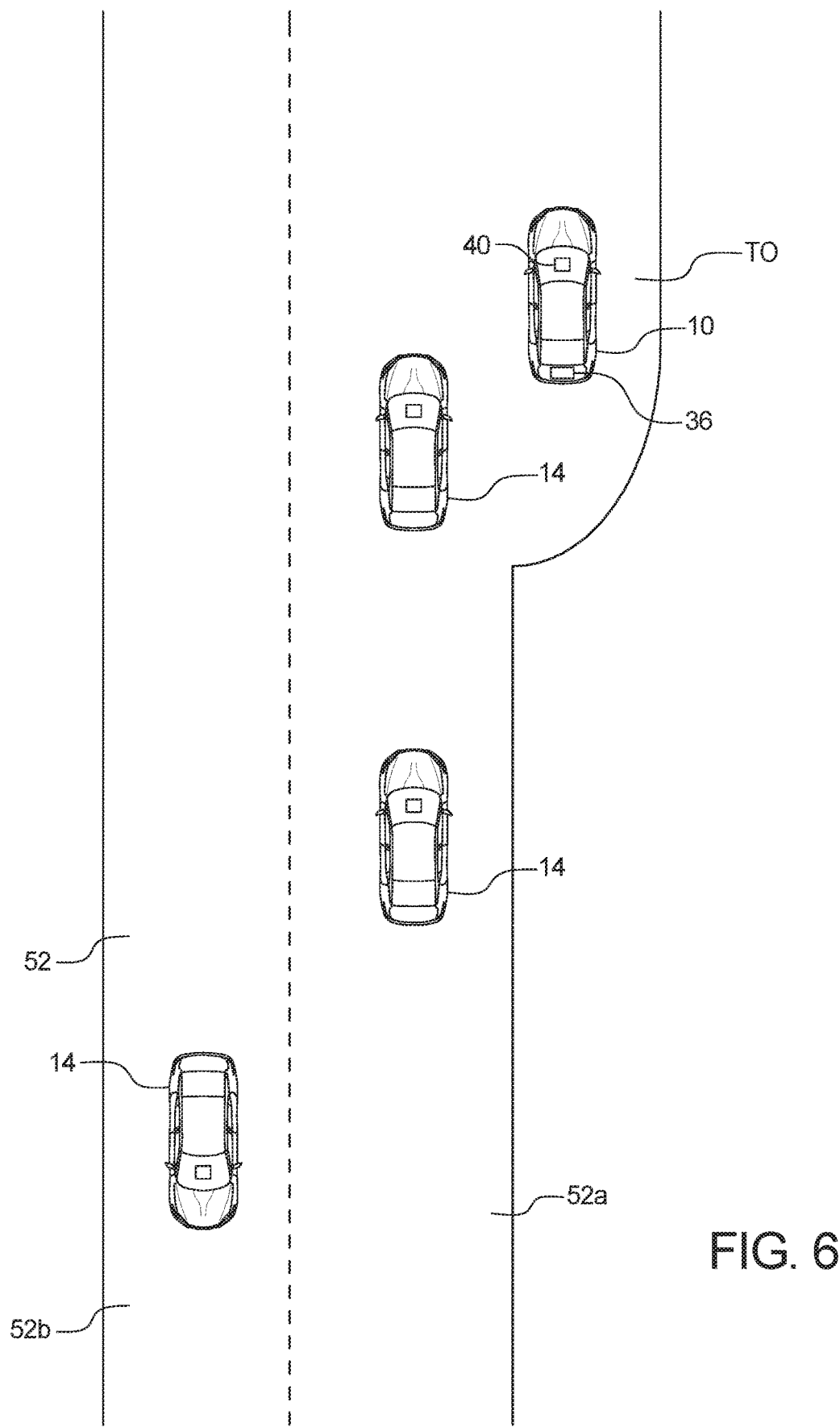
FIG. 6 is a schematic representation of the host vehicle of FIG. 3 pulled over in a turn out.

FIGS. 5 and 6 illustrate a second embodiment of the system 12 and the procedure. In this embodiment, the host vehicle 10 is traveling along a two lane road 52 with a plurality of remote vehicles 14 following. In this embodiment, the two lane road 52 includes a first lane 52a for vehicles traveling in a first direction and a second lane 52b for vehicles traveling in a second direction, opposite to the first direction. In this embodiment, socially acceptable behavior would require the host vehicle 10 enable the remote vehicles 14 to pass. Thus, as the host vehicle 14 travels along the road 52, the information system receives information related to an environment of the automated vehicle. That is, the sensor system (sensors 26a-26b) detects following vehicles 14 or the receiver/transmitter 28 receives information from one or more of the remote vehicles 14 that a plurality of remote vehicles 14 is following the host vehicle 10. The controller 24 retrieves information stored in the data storage 42, such as a predetermined socially acceptable behavior parameter SAP. In this embodiment, the predetermined socially acceptable behavior parameter SAP can be information that when a vehicle is following the host vehicle 10 within a predetermined distance $D_2$ or is approaching the host vehicle 10 and comes within a predetermined distance $D_2$, it is socially acceptable to pull into another lane or a turn out to enable the remote vehicle 14 or vehicles to pass.

The controller 24 compares the information received from the information system to the predetermined socially acceptable behavior parameter SAP and determines the host vehicle 10 behavior based on the information. That is, the controller 24 can determine that the remote vehicle 14 is following the host vehicle 10 and is within a predetermined distance $D_2$ of the host vehicle. Once the controller 24 determines that a socially acceptable behavior is warranted, the controller 24 can cause the notification device to present a notification of a course of action based on the determined vehicle behavior. In one embodiment, the notification device can be the display 40, which displays in the passenger compartment PC of the host vehicle 10 a socially acceptable course of action (i.e., a visual course of action). For example, the display 40 can display a representation of map data indicating a turn out TO ahead and the host vehicle 10 should be operated to turn into the turn out TO. Alternatively, the display 40 can present text information that a turn out TO is a distance ahead and the host vehicle 10 should be operated to turn into the turn out TO. In other embodiments, any suitable notification—e.g., a light, a tactile vibration, a manipulation of the steering system 48 or any other notification or combination of notifications—can be made.

Additionally, as illustrated in FIG. 5, the controller 24 can cause the external notification device 36 to indicate the host vehicle's intended course of action to the following remote vehicle 14. For example, in one embodiment, the external notification device 36 can display a textual message "TAKING TURN OUT". Accordingly, the remote vehicle 14 will be appraised of and understand the host vehicle's intended course of action.

In one embodiment, the monitor (e.g., the positioning system 30, sensor system (sensors (26a-26d), and/or the steering system 48) can monitor the vehicle behavior to determine whether the operator of the vehicle 10 operated the vehicle 10 in the manner suggested. Moreover, the monitor through the eye tracker 38 can detect whether the operator of the vehicle 10 has looked in the rear view mirror to determine whether vehicles are following. If the operator has not looked in the rear view mirror, the controller 24 can cause the display 40 to display such information or cause the warning indicator 32 or tactile system 34 to alert the operator to look in the rear view mirror.

As shown in FIG. 6, the operator of the host vehicle 10 can then take the turn out TO, enabling the remote vehicle 14 to pass. The operator of the host vehicle 10 will thus learn and understand socially acceptable behavior based on the notification of the system 12. Alternatively, the host vehicle 10 can autonomously perform an operation that will maneuver the host vehicle 10 into the turn out TO to enable the remote vehicle 14 to pass. The operator of the host vehicle 10 will thus learn and understand socially acceptable behavior based on the operation of the system 12.

In one embodiment, the monitor (e.g., the positioning system, 30 sensor system (sensors 26a-26d), and/or the steering system 48) can monitor the vehicle behavior to determine whether the operator of the vehicle 10 operated the vehicle 10 in the manner suggested. Moreover, the monitor through the eye tracker 38 can detect whether the operator of the vehicle 10 has looked in the rear view mirror to determine whether vehicles are following. If the operator has not looked in the rear view mirror, the controller 24 can cause the display 40 to display such information or cause the warning indicator 32 or tactile system 34 to alert the operator to look in the rear view mirror.

Figure 7:
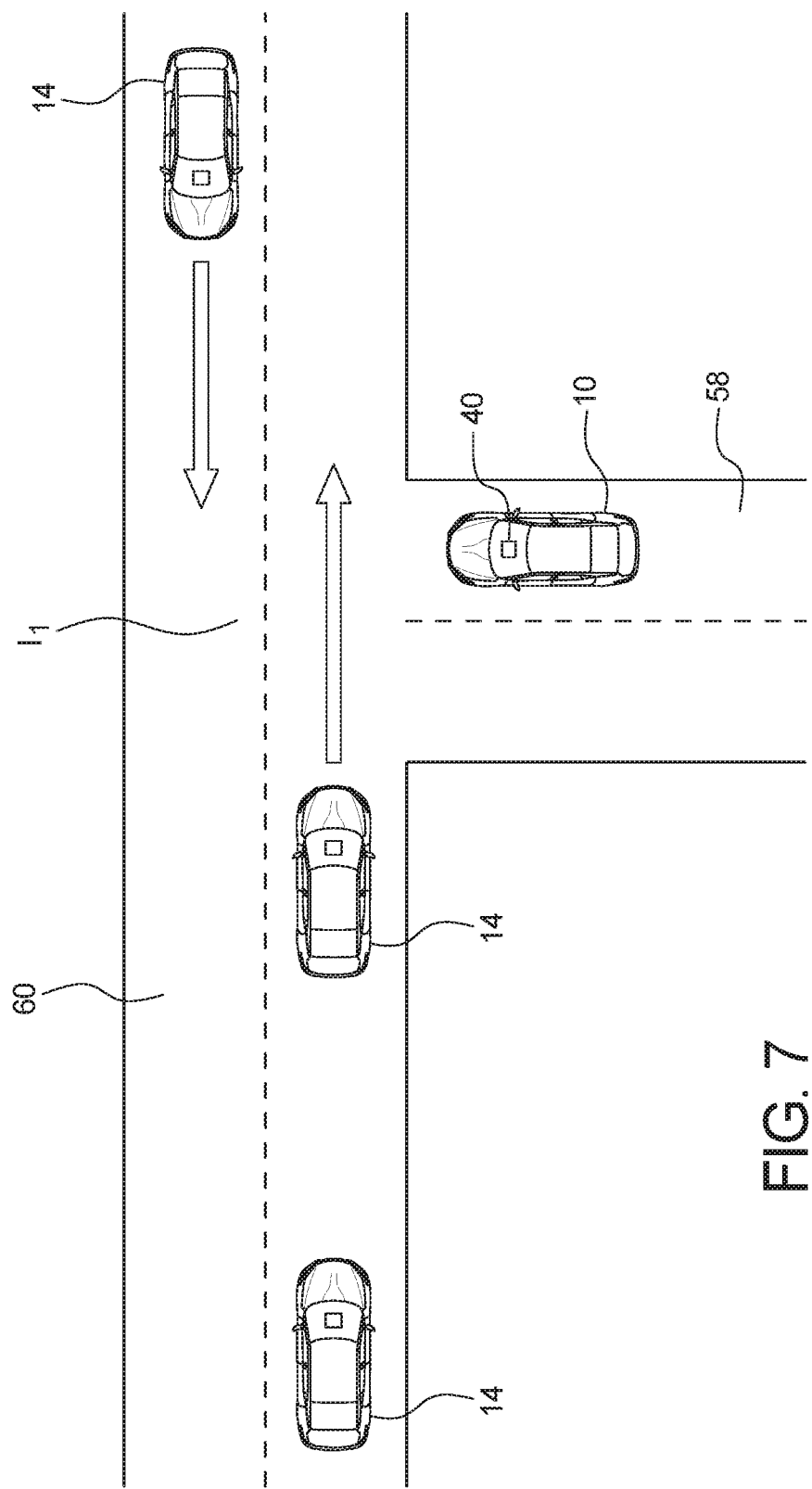
FIG. 7 is a schematic representation of a host vehicle stopped a crossroad.
Figure 8A:
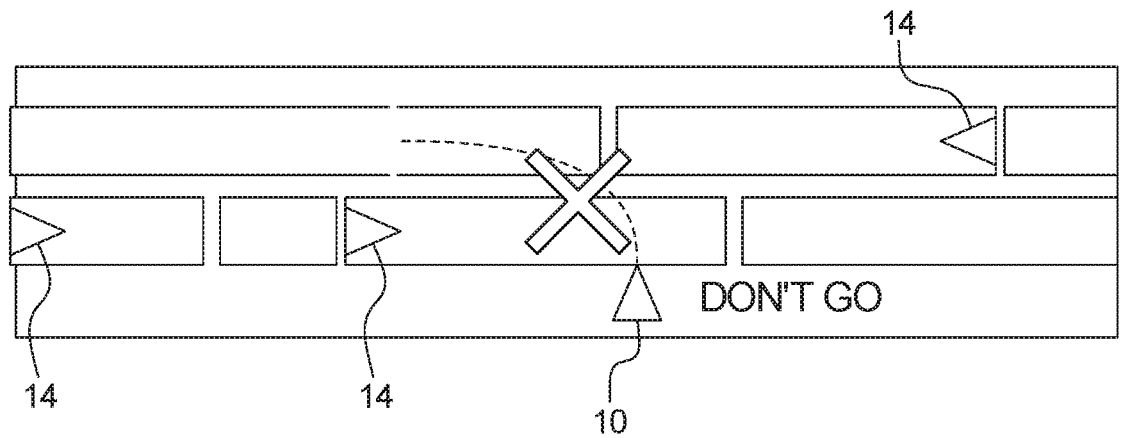
FIG. 8A is a schematic representation of the automated vehicle system indicating an improper advancing situation.
Figure 8B:
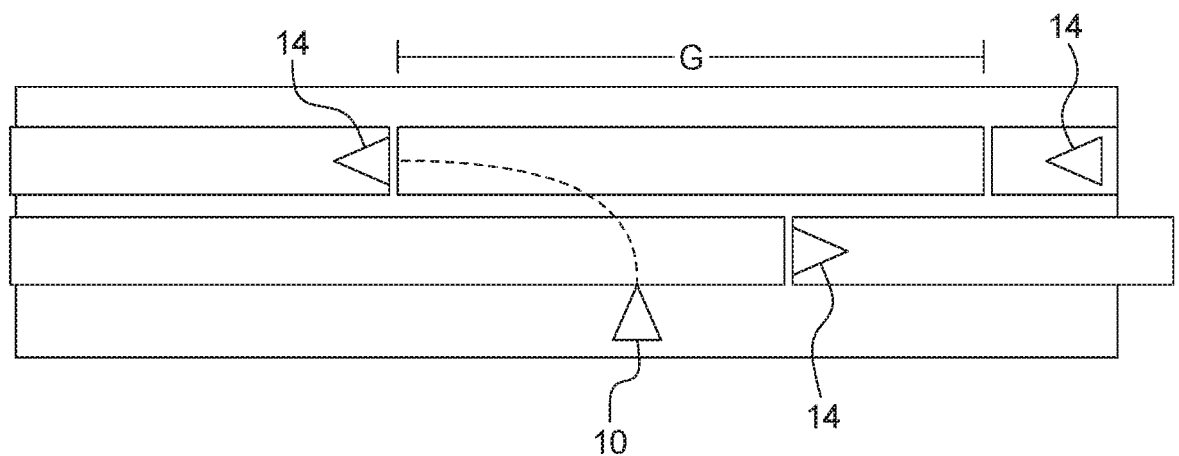
FIG. 8B is a schematic representation of the automated vehicle system indicating a proper advancing situation.

FIGS. 7-8B illustrate a third embodiment of the system 12 and the procedure. In this embodiment, the host vehicle 10 is traveling along a road 58 and approaches an intersection $I_1$ with a plurality of remote vehicles 14 traveling along a crossroad 60. In this embodiment, socially acceptable behavior would require the host vehicle 10 to wait until a sufficient gap G exists between the remote vehicles 14 such that the host vehicle 10 can safely enter the crossroad 60. Thus, as the host vehicle 10 is in a stopped state at the intersection I, the information system receives information related to an environment of the host vehicle 10. That is, the sensor system (sensors 26a-26d) can detect remote vehicles 14 approaching the intersection $I_1$ or the receiver/transmitter 28 receives information from one or more remote vehicles 14 that a plurality of remote vehicles is approaching the intersection $I_1$. The controller 24 retrieves information stored in the data storage 42, such as a predetermined socially acceptable behavior parameter SAP. In this embodiment, the predetermined socially acceptable behavior parameter SAP can be information that when a making a turn at an intersection I, a sufficient gap in time or distance exists between remote vehicles 14 such that the host vehicle 10 can safely enter the crossroad 60.

The controller 24 compares the information received from the information system to the predetermined socially acceptable behavior parameter SAP and determines the host vehicle behavior based on the information. That is, the controller 24 can determine that the remote vehicles 14 are traveling such that a sufficient gap G in time or distance exists between remote vehicles 14 such that the host vehicle 10 can safely enter the crossroad 60. Once the controller 24 determines that a socially acceptable behavior is warranted, the controller 24 can cause the notification device to present a notification of a course of action based on the determined vehicle behavior. In one embodiment, the notification device can be the display, which displays in the interior of the host vehicle 10 a socially acceptable course of action (i.e., a visual course of action).

FIG. 8A illustrates a display of behavior that is not socially acceptable, i.e., the remote vehicles 14 are traveling such that a sufficient gap in time or distance does not exist between remote vehicles 14 such that the host vehicle 10 can safely enter the crossroad. FIG. 8B illustrates a display of behavior that is socially acceptable, i.e., the remote vehicles 14 are traveling such that a sufficient gap G in time or distance exists between remote vehicles 14 such that the host vehicle 10 can safely enter the crossroad 60. The display 40 can display a representation of map data indicating were and when the host vehicle should turn to affect the socially acceptable behavior and/or a clear display when the behavior is not socially acceptable. Alternatively, the display can present text information of when to turn in a socially acceptable manner. In other embodiments, any suitable notification—e.g., a light, a tactile vibration, a manipulation of the steering system 48 or any other notification or combination of notifications—can be made.

The operator of the host vehicle 10 can then turn onto the crossroad 60. The operator of the host vehicle 10 will thus learn and understand socially acceptable behavior based on the notification of the system. Alternatively, the host vehicle 10 can autonomously perform an operation that will maneuver the host vehicle 10 into the crossroad 60 such that the host vehicle 10 safely enters the crossroad 60. The operator of the host vehicle will thus learn and understand socially acceptable behavior based on the operation of the system.

In one embodiment, the monitor (e.g., the positioning system 30, sensor system (sensors 26a-26d), and/or the steering system 48) can monitor the vehicle behavior to determine whether the operator of the vehicle 10 operated the vehicle 10 in the manner suggested. Moreover, the monitor, through the eye tracker 38, can detect whether the operator of the vehicle 10 has looked to the left and right to determine whether any remote vehicles 14 are approaching the intersection I. If the operator has not looked to the left and right, the controller 24 can cause the display 40 to display such information or cause the warning indicator 32 or tactile system 34 to alert the operator to look in the rear view mirror.

Figure 9:
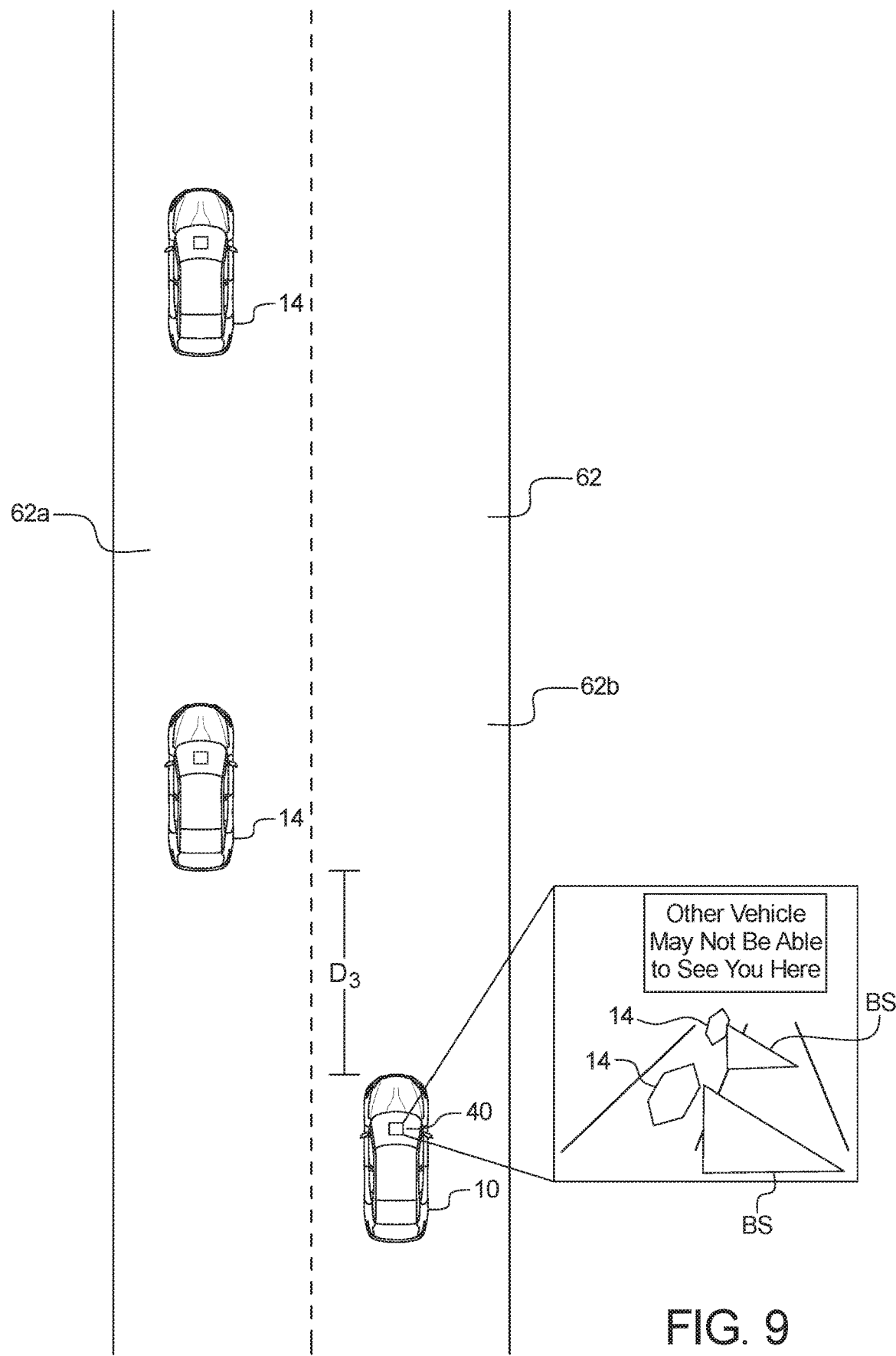
FIG. 9 is a schematic representation of a host vehicle traveling along a road and the automated vehicle system indicating improved social behavior.

FIG. 9 illustrates a fourth embodiment of the system 12 and the procedure. In this embodiment, the host vehicle 10 is traveling along a road 62 following a remote vehicle 14 or a plurality of remote vehicles. The road 62 is a two lane road with a first lane 62a and a second lane 62b, with the first lane 62a and the second lane 62b being lanes that travel in the same direction. The host vehicle 10 can be traveling in the second lane 62b (i.e., the right lane) and the remote vehicles 14 can be traveling in the first lane 62a (i.e., the left lane). Thus, the host vehicle could travel in the blind spot BS of the remote vehicles 14. In this embodiment, socially acceptable behavior would require the host vehicle 10 to follow such that the host vehicle 10 is not in the blind spot BS of the remote vehicle 14. Thus, as the host vehicle 10 travels along the road 62, the information system receives information related to an environment of the host vehicle. That is, the sensor system (sensors 26a-26d) detects the remote vehicles 14 or the receiver/transmitter 28 receives from at least one remote vehicle 14 information regarding to location, direction and speed of the remote vehicles 14. The controller 24 retrieves information stored in the data storage 42, such as a predetermined socially acceptable behavior parameter SAP. In this embodiment, the predetermined socially acceptable behavior parameter SAP can be information that when the host vehicle 10 is following the remote vehicle 14 within a predetermined distance $D_3$ or is approaching the remote vehicle 14 and comes with a predetermined distance $D_3$, it is socially acceptable to follow the remote vehicles 14 in an area that is visually detectable by the operator (i.e., not in the blind spot BS) of the remote vehicle 14.

The controller 24 compares the information received from the information system to the predetermined socially acceptable behavior parameter SAP and determines the host vehicle behavior based on the information. That is, the controller 24 can determine that the host vehicle 10 is following the remote vehicle 14 and is within the predetermined distance $D_3$ of the remote vehicle 14 and estimate the location of the blind spot BS of the remote vehicles 14. Once the controller 24 determines that a socially acceptable behavior is warranted, the controller 24 can cause the notification device to present a notification of a course of action based on the determined vehicle behavior. In one embodiment, the notification device can be the display 40, which displays in the passenger compartment PC of the host vehicle 10 a socially acceptable course of action (i.e., a visual course of action). For example, the display 40 can display a representation of map data indicating a location of the blind spots BS of the remote vehicles 14 and that these areas should be avoided. Alternatively, the display can present text information that the blind spots of the remote vehicles should be avoided—i.e., "Other Vehicle May Not Be Able to See You Here". In other embodiments, any suitable notification—e.g., a light, a tactile vibration, a manipulation of the steering system 48 or any other notification or combination of notifications—can be made.

The operator of the host vehicle 10 can then operate the host vehicle 10 to avoid the blind spots BS of the remote vehicles 14. The operator of the host vehicle 10 will thus learn and understand socially acceptable behavior based on the notification of the system 12. Alternatively, the host vehicle 10 can autonomously perform an operation that will maneuver avoid the blind spots BS of the remote vehicles 14. The operator of the host vehicle 10 will thus learn and understand socially acceptable behavior based on the operation of the system 12.

In one embodiment, the monitor (e.g., the positioning system 30, sensor system (sensors 26a-26d), and/or the steering system 48) can monitor the vehicle behavior to determine whether the operator of the vehicle 10 operated the vehicle 10 in the manner suggested.

Figure 10:
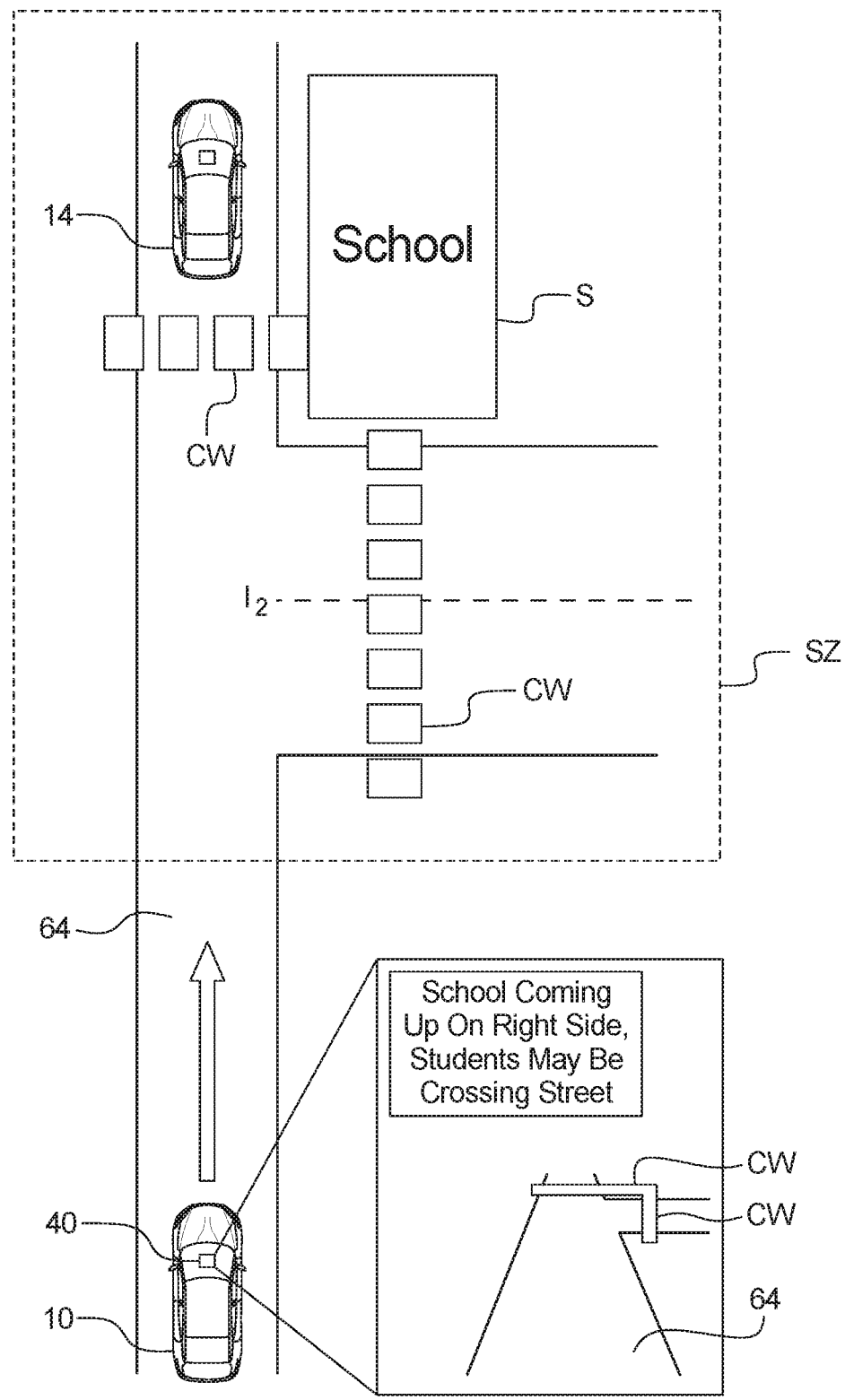
FIG. 10 is a schematic representation of a host vehicle traveling along a road and the automated vehicle system indicating improved social behavior.

FIG. 10 illustrates a fifth embodiment of the system and procedure. In this embodiment, the host vehicle 10 is traveling along a road 64 and approaches a school zone SZ. In this embodiment, socially acceptable behavior would require the host vehicle 10 slow to the appropriate school zone speeds. Thus, as the host vehicle 10 travels along the road 62, the information system receives information related to an environment of the host vehicle 10. That is, the positioning system 30 can detect a school S within a school zone SZ in the vicinity of the host vehicle 10. Additionally, the sensors 26a-26d can detect activity within the school zone SZ (e.g., students or pedestrians crossing the road and/or crosswalks CW). The controller 24 retrieves information stored in the data storage 42, such as a predetermined socially acceptable behavior parameter SAP. In this embodiment, the predetermined socially acceptable behavior parameter SAP can be information of the appropriate speed and behavior (i.e., stopping for crossings) within a school zone.

The controller 24 compares the information received from the information system to the predetermined socially acceptable behavior parameter SAP and determines the host vehicle 10 behavior based on the information. That is, the controller 24 can determine that the host vehicle 10 will enter a school zone SZ and a different speed of the host vehicle 10 is necessary or that brakes should be applied to enable students or people to cross. Once the controller 24 determines that a socially acceptable behavior is warranted, the controller 24 can cause the notification device to present a notification of a course of action based on the determined vehicle behavior. In one embodiment, the notification device can be the display 40, which displays in the passenger compartment PC of the host vehicle 10 a socially acceptable course of action (i.e., a visual course of action).

For example, the display 40 can display a representation of map data indicating a location of the school zone SZ and any activity within the school zone SZ. Alternatively or additionally, the display 40 can present text information of the location of the school zone and a textual display—e.g., "School Coming Up On Right Side, Students May Be Crossing Street". In other embodiments, any suitable notification—e.g., a light, a tactile vibration, a manipulation of the steering system 48 or any other notification or combination of notifications—can be made.

The operator of the host vehicle 10 can then operate the host vehicle 10 in a slower manner or stop for pedestrians crossing the road 64. The operator of the host vehicle 10 will thus learn and understand socially acceptable behavior based on the notification of the system 12. Alternatively, the host vehicle 10 can autonomously perform an operation that will operate the host vehicle 10 in a slower manner or stop for pedestrians crossing the road 64. The operator of the host vehicle 10 will thus learn and understand socially acceptable behavior based on the operation of the system. 12

In one embodiment, the monitor (e.g., the positioning system 30, sensor system (sensors 26a-26d), and/or the steering system 48) can monitor the vehicle behavior to determine whether the operator of the vehicle 10 operated the vehicle 10 in the manner suggested. Moreover, the monitor, through the eye tracker 38, can detect whether the operator of the vehicle 10 has looked in the direction of the school S or the pedestrians. If the operator has not looked in the direction of the school S or the pedestrians the controller 24 can cause the display 40 to display such information or cause the warning indicator 32 or tactile system 34 to alert the operator to look in the rear view mirror.

Figure 11:
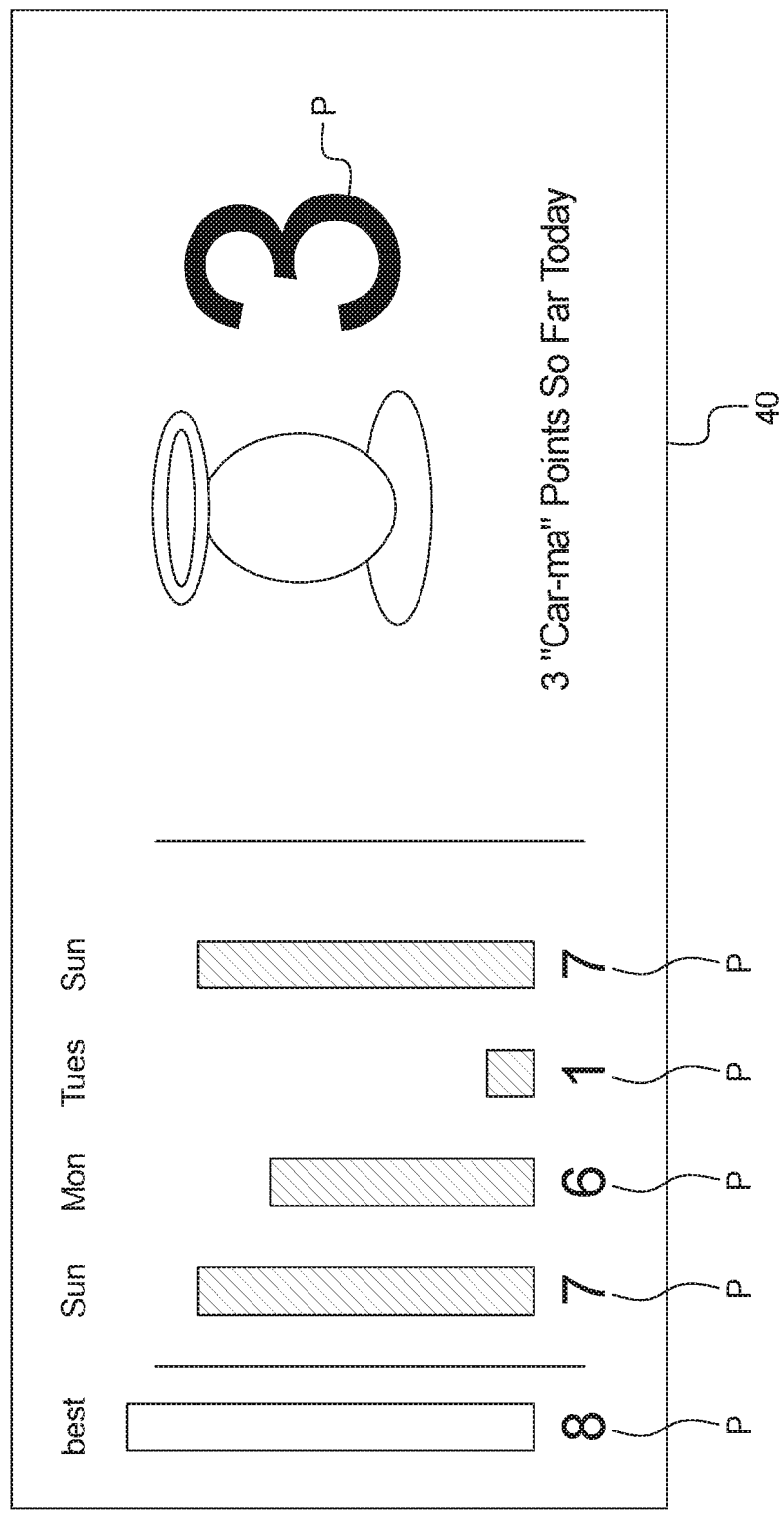
FIG. 11 is a schematic representation of a scoring system for performance of improved social behavior.

In some embodiments, the controller 24 can operate a gamification component. In this embodiment, as shown in FIG. 11, the controller 24, based on information from the monitor, can determine whether the operator of the host vehicle 10 has operated the vehicle in the manner recommended by the system. When the operator of the vehicle 10 operates the vehicle 10 in the manner recommended by the system 12, the controller 24 awards points P to the operator that can be displayed on the display 40 or on any other suitable device (e.g., a smart phone or tablet). Thus, as shown in FIG. 11, the system awards the operator of the vehicle "points" (here "Car-ma points") on a daily basis with a "high score" or best score.

This rating can be permanent to the operator or resettable, similar to fuel economy. In one embodiment, the rating can be linked to the individual operator via the monitor, so ratings for multiple users of the same vehicle can be kept separate.

Figure 12:
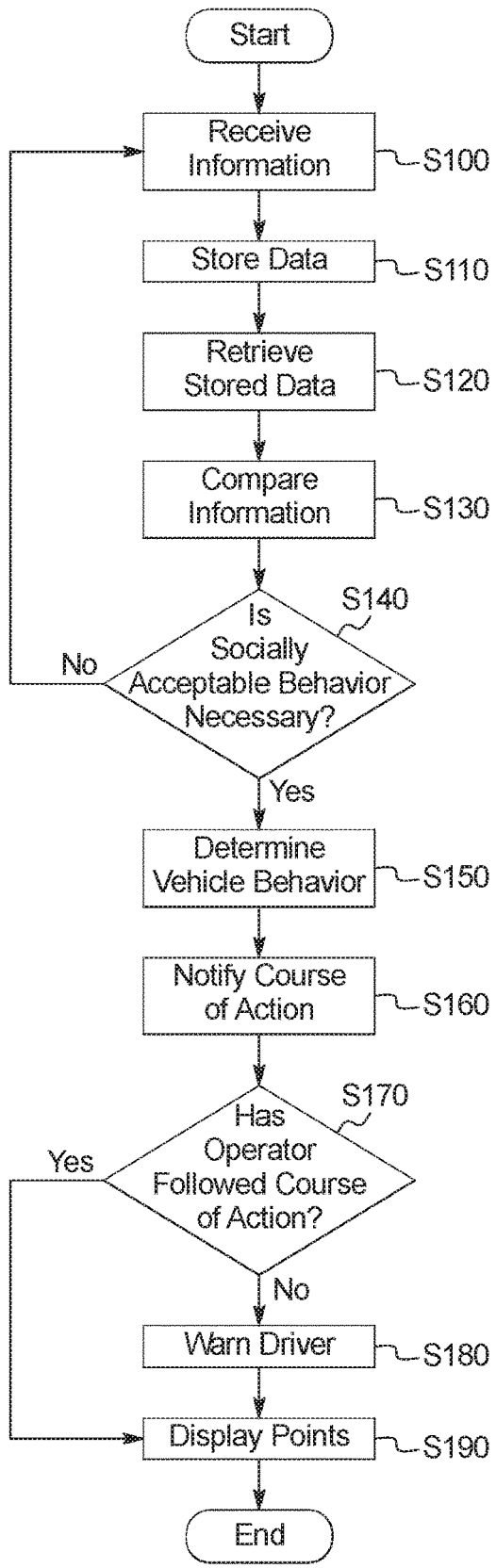
FIG. 12 illustrates a flow chart of the process of improving social behavior.

FIG. 12 illustrates a flow chart of the process of improving social behavior. In step S100, the information system receives information. As discussed herein the information system can be one or a plurality the sensor system (sensors 26a-26d), receiver/transmitter system 28 and/or a positioning system 30. The data storage 42 in step S110 stores storing data having a predetermined socially acceptable behavior parameter SAP stored therein. As can be understood the data can be stored at any suitable time in any suitable manner. In step S120 the controller retrieves the data stored in the storage device 42 (e.g., the predetermined socially acceptable behavior parameter SAP) and compares information received from the information system with the predetermined socially acceptable behavior parameter SAP stored in data storage in step S130. In step S140, the controller 24, based on the comparison of the information to the predetermined socially acceptable behavior parameter SAP whether a socially acceptable behavior is necessary or warranted. If no socially acceptable behavior is warranted, the system 12 returns to receiving data. If the controller 24 determines that socially acceptable behavior is warranted, the controller 24 determines the vehicle behavior based on the information in step S150. In step S160, the controller 24 causes the notification device to notify the operator of the vehicle 10 of a course of action based on the determined vehicle behavior. In step S170 based on the information from the monitor, the controller 24 determines whether the operator of the vehicle 10 has followed the course of action. If the operator has not followed the course of action, the controller causes the warning indicator 32 to warn the operator of the vehicle in step S180. The controller 24 can then cause the display 40 to display gamification points in step S190. If the operator has followed the course of action, the controller 24 causes the display to display gamification points in step S190.

The eye tracker, sensors and positioning system are conventional components that are well known in the art. Since eye trackers, sensors and positioning systems are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An automated vehicle system, comprising:
    an information system configured to receive information related to an environment of the automated vehicle;
    data storage having a predetermined socially acceptable behavior parameter stored therein;
    an electronic controller configured to compare the information to the predetermined socially acceptable behavior parameter, determine vehicle behavior based on the information; and
    a first display configured to present a notification of a course of action based on the determined vehicle behavior,
    the controller configured to award an operator of the automated vehicle points for following the course of action, accumulate the points into a first set of accumulated total points, reset the points to zero, accumulate a second set of points into a second set of accumulated total points, and at least one of the first display and a second display configured to display the first set of accumulated total points and the second set of accumulated total points, the first set of accumulated total points for the operator and second set of accumulated total points for the same operator compared to a high score for the operator to enable a gamification mode.

2. The automated vehicle system according to claim 1, wherein
the display is configured to display a visual notification on a display.

3. The automated vehicle system according to claim 1, wherein
the automated vehicle system is configured to provide auditory information.

4. The automated vehicle system according to claim 1, wherein
the course of action is a visual course of action.

5. The automated vehicle system according to claim 1, wherein
the information system includes a receiver configured to receive transmitted information from a remote vehicle.

6. The automated vehicle system according to claim 1, wherein
the information system includes a sensor configured to detect objects in a vicinity of the automated vehicle.

7. The automated vehicle system according to claim 1, wherein
the information system includes a positioning system.

8. The automated vehicle system according to claim 1, further comprising
a monitor disposed within the passenger compartment of the automated vehicle, the monitor configured to monitor the viewing direction of an operator of the automated vehicle.

9. The automated vehicle system according to claim 1, further comprising
an external display configured to notify a remote vehicle of the course of action of the automated vehicle.

10. A method of operating an automated vehicle, comprising:
receiving, via an information system, information related to an environment of the automated vehicle;
storing data including a predetermined socially acceptable behavior parameter;
comparing, via an electronic controller, the information to a predetermined socially acceptable behavior parameter stored in data storage;
determining with the controller vehicle behavior based on the information;
notifying with a display a course of action based on the determined vehicle behavior;
awarding to an operator of the automated vehicle with the electronic controller points for following the course of action;
accumulating with the controller, the points into a first set of accumulated total point; resetting the points;
accumulating with the controller, the points into a second set of accumulated total point; and
displaying the first set of accumulated total points with at least one of a first display and a second display, the first set of accumulated total points for the operator and the second set of accumulated total points for the same operator compared to a high score for the operator to enable a gamification mode.

11. The method according to claim 10, wherein
the notifying includes displaying a visual notification on the display.

12. The method according to claim 10, wherein
the notifying includes providing an auditory notification.

13. The method according to claim 10, wherein
the course of action is a visual course of action.

14. The method according to claim 10, wherein
the receiving the information includes receiving with a receiver the information transmitted from a remote vehicle.

15. The method according to claim 10, wherein
the receiving the information includes detecting an object in a vicinity of the automated vehicle with a sensor.

16. The method according to claim 10, wherein
the receiving the information includes receiving position location for a positioning system.

17. The method according to claim 10, further comprising
monitoring, with a monitor disposed within the passenger compartment of the automated vehicle, the viewing direction of an operator of the automated vehicle.

18. The method according to claim 10, further comprising
displaying with an external display the course of action of the automated vehicle.

19. The automated vehicle system according to claim 1, wherein
the electronic controller is configured to enable a re-setting of the points.

20. The method according to claim 10, further comprising re-setting the points.

\* \* \* \* \*